United States Patent
Yang et al.

(10) Patent No.: US 12,525,608 B2
(45) Date of Patent: Jan. 13, 2026

(54) ANODE ACTIVE MATERIAL FOR LITHIUM SECONDARY BATTERY AND LITHIUM SECONDARY BATTERY INCLUDING THE SAME

(71) Applicants: SK ON CO., LTD., Seoul (KR); SK INNOVATION CO., LTD., Seoul (KR)

(72) Inventors: Young Mo Yang, Daejeon (KR); Joon Hyung Moon, Daejeon (KR); Do Ae Yu, Daejeon (KR); Ju Ho Chung, Daejeon (KR); Jae Young Choi, Daejeon (KR)

(73) Assignees: SK ON CO., LTD., Seoul (KR); SK INNOVATION CO., LTD., Seoul (KR)

( * ) Notice: Subject to any disclaimer, the term of this patent is extended or adjusted under 35 U.S.C. 154(b) by 0 days.

(21) Appl. No.: 18/301,680

(22) Filed: Apr. 17, 2023

(65) Prior Publication Data
US 2024/0021799 A1  Jan. 18, 2024

(30) Foreign Application Priority Data
Jun. 21, 2022 (KR) .......................... 10-2022-0075725

(51) Int. Cl.
*H01M 4/36* (2006.01)
*H01M 4/02* (2006.01)
(Continued)

(52) U.S. Cl.
CPC .......... *H01M 4/366* (2013.01); *H01M 4/386* (2013.01); *H01M 4/485* (2013.01); *H01M 4/583* (2013.01); *H01M 2004/027* (2013.01)

(58) Field of Classification Search
CPC . H01M 4/00–04; H01M 4/0419–0428; H01M 4/13; H01M 4/133–134;
(Continued)

(56) References Cited

U.S. PATENT DOCUMENTS

| 10,424,786 B1 * | 9/2019 | Mason | H01M 4/362 |
| 2011/0159368 A1 * | 6/2011 | Hirose | H01M 10/0525 |
| | | | 429/231.8 |

(Continued)

FOREIGN PATENT DOCUMENTS

| JP | 2014175071 A | * | 9/2014 | .......... H01M 10/052 |
| KR | 10-1591698 B1 | | 2/2016 | |
| KR | 20180092532 A | | 8/2018 | |

OTHER PUBLICATIONS

Machine translation of Hirose, JP-2014175071-A. Originally available Sep. 22, 2014. (Year: 2014).*

(Continued)

*Primary Examiner* — Jonathan Crepeau
*Assistant Examiner* — Jacob Buchanan
(74) *Attorney, Agent, or Firm* — IP & T GROUP LLP

(57) ABSTRACT

An anode active material for a secondary battery includes a plurality of composite particles. The composite particles include carbon-based particles containing pores therein. A silicon-containing coating layer is formed inside the pores or on a surface of the carbon-based particles. A surface oxide layer is formed on the silicon-containing coating layer. The surface oxide layer contains silicon oxide. A silicon oxidation number ratio of the composite particle is predefined.

12 Claims, 2 Drawing Sheets

(51) Int. Cl.
*H01M 4/38* (2006.01)
*H01M 4/485* (2010.01)
*H01M 4/583* (2010.01)

(58) Field of Classification Search
CPC ..... H01M 4/139; H01M 4/1393–1395; H01M 4/36–362; H01M 4/366; H01M 4/485; H01M 4/58; H01M 4/583
See application file for complete search history.

(56) References Cited

U.S. PATENT DOCUMENTS

| | | | |
|---|---|---|---|
| 2015/0340691 A1* | 11/2015 | Inoue | H01M 10/0525 |
| | | | 429/219 |
| 2016/0028084 A1* | 1/2016 | Lee | H01M 4/587 |
| | | | 216/13 |
| 2016/0079591 A1* | 3/2016 | Yang | C04B 35/62839 |
| | | | 427/122 |
| 2021/0328219 A1 | 10/2021 | Cho et al. | |
| 2024/0297299 A1* | 9/2024 | Lee | H01M 4/587 |

OTHER PUBLICATIONS

Extended European Search Report for the European Patent Application No. 23170512.0 issued by the European Patent Office on Dec. 4, 2023.
Ou Jung Kwon et al., A simple preparation method for spherical carbons and their anodic performance in lithium secondary batteries, Journal of Power Sources, Jan. 14, 2004, pp. 221-227, vol. 125, No. 2, Elsevier.

* cited by examiner

ANODE ACTIVE MATERIAL FOR LITHIUM SECONDARY BATTERY AND LITHIUM SECONDARY BATTERY INCLUDING THE SAME

CROSS-REFERENCE TO RELATED APPLICATION

This application claims priority to Korean Patent Application No. 10-2022-0075725 filed on Jun. 21, 2022 in the Korean Intellectual Property Office (KIPO), the entire disclosure of which is incorporated by reference herein.

BACKGROUND

1. Field

The present application relates to an anode active material for a lithium secondary battery and a lithium secondary battery including the same.

2. Description of the Related Art

A secondary battery which can be charged and discharged repeatedly has been widely employed as a power source of a mobile electronic device such as a camcorder, a mobile phone, a laptop computer, etc., and has assisted in the development of information and display technologies. Recently, a battery pack including the secondary battery has been developed and applied as a power source for a vehicle.

The secondary battery typically includes, e.g., a lithium secondary battery, a nickel-cadmium battery, a nickel-hydrogen battery, etc. The lithium secondary battery is of interest due to its high operational voltage and energy density per unit weight, its high charging rate, its compact dimension, etc.

In one example, a lithium secondary battery may include an electrode assembly including a cathode, an anode and a separation layer (separator), and an electrolyte immersing the electrode assembly. Such a lithium secondary battery may further include an outer case having, e.g., a pouch shape for accommodating the electrode assembly and the electrolyte.

Recently, as the range of applications for the lithium secondary battery has expanded, a lithium secondary battery having a higher capacity and a higher power has been researched. In one example, a composite of high-capacitance silicon and carbon has been used as an anode active material.

However, such a silicon-carbon composite anode active material has a large volume expansion difference which can cause cracks of the anode active material and exposure to an electrolyte solution during repeated charging and discharging.

Accordingly, an anode active material capable of maintaining capacity properties while suppressing the cracks of the anode active material is required. In one example, Korean Registered Patent Publication No. 10-1591698 describes an anode active material containing silicon oxide, but the silicon oxide anode material described there may not provide sufficient life-span and power properties for a secondary battery.

SUMMARY

According to one aspect of the present application, there is provided an anode active material for a lithium secondary battery used as a power source for an eco-friendly vehicle such as an electric vehicle, which has improved power property and capacity efficiency.

According to another aspect of the present application, there is provided a secondary battery including an anode active material with improved power property and capacity efficiency.

In one embodiment of the present application, an anode active material for a lithium secondary battery includes a plurality of a composite particle. The composite particle includes a carbon-based particle containing pores therein, a silicon-containing coating layer formed at an inside of the pores or on a surface of the carbon-based particle, and a surface oxide layer formed on the silicon-containing coating layer. The surface oxide layer contains silicon oxide. A silicon oxidation number ratio defined by Equation 1 of the composite particle is 0.6 or less.

$$\text{silicon oxidation number ratio} = O_B/O_S \quad [\text{Equation 1}]$$

In Equation 1, "$O_B$" is an oxidation number of silicon included in the silicon-containing coating layer measured by an X-ray photoelectron spectroscopy (XPS), and "$O_S$" is an oxidation number of silicon included in the surface oxide layer measured by the XPS.

In some embodiments, "$O_B$" may be obtained by substituting a first value, obtained by subtracting 99.6 eV from a binding energy of silicon included in the silicon-containing coating layer measured by the XPS, into a silicon oxidation number calibration curve. "$O_S$" may be obtained by substituting a second value, obtained by subtracting 99.6 eV from a binding energy of silicon included in the surface oxide layer measured by the XPS, into the silicon oxidation number calibration curve.

In some embodiments, the silicon oxidation number calibration curve may be obtained by connecting points corresponding to $Si^0$, $Si^{1+}$, $Si^{2+}$, $Si^{3+}$ and $Si^{4+}$ with a shortest distance between neighboring points in a graph in which an x-axis represents oxidation numbers of silicon and a y-axis represents the first and second values obtained by subtracting 99.6 eV from the binding energies of silicon measured by the XPS.

In some embodiments, a distance between a surface of the composite particle and the silicon-containing coating layer may be 100 nm to 700 nm, and a distance between the surface of the composite particle and the surface oxide layer formed on the silicon-containing coating layer may be 10 nm or less.

In some embodiments, "$O_B$" may be in a range from 1.2 to 2.0 and "$O_S$" May be in a range from 3.0 to 3.6.

In some embodiments, an oxygen content ratio defined by Equation 2 is 0.4 or less.

$$\text{oxygen content ratio} = C_B/C_S \quad [\text{Equation 2}]$$

In Equation 2, "$C_B$" is a percentage (at %) of the number of oxygen atoms included in the silicon-containing coating layer relative to a sum of the number of atoms included both in the silicon-containing coating layer and in the surface oxide layer measured by the XPS. "$C_S$" is a percentage (at %) of the number of oxygen atoms included in the surface oxide layer relative to the sum of the number of atoms included both in the silicon-containing coating layer and in the surface oxide layer measured by the XPS.

In some embodiments, "$C_B$" may be in a range from 8 at % to 15 at %, and "$C_S$" may be in a range from 15 at % to 34 at %.

In some embodiments, the carbon-based particle may include at least one selected from the group of an activated carbon, a carbon nanotube, a carbon nanowire, graphene, a carbon fiber, carbon black, graphite, a porous carbon, pyrolyzed cryogel, pyrolyzed xerogel, and pyrolyzed aerogel.

In some embodiments, the carbon-based particle may have an amorphous structure.

In some embodiments, silicon included in the silicon-containing coating layer may have an amorphous structure or a crystallite size measured by an X-ray diffraction (XRD) analysis of 7 nm or less.

In some embodiments, the crystallite size of silicon included in the silicon-containing coating layer may be measured by Equation 3.

$$L = \frac{0.9\lambda}{\beta \cos\theta} \quad \text{[Equation 3]}$$

In Equation 3, "L" represents the crystallite size (nm), "λ" represents an X-ray wavelength (nm), "β" represents a full width at half maximum (rad) of a peak corresponding to a (111) plane of silicon contained in the silicon-containing coating layer, and "θ" represents a diffraction angle (rad).

In some embodiments, silicon included in the silicon-containing coating layer may have a peak intensity ratio of 1.2 or less in a Raman spectrum defined by Equation 4.

peak intensity ratio of Raman spectrum=$I(515)/I(480)$    [Equation 4]

In Equation 4, "I(515)" is a peak intensity of silicon included in the silicon-containing coating layer in a region of 515 $cm^{-1}$ wavenumber in the Raman spectrum, and "I(480)" is a peak intensity of silicon included in the silicon-containing coating layer in a region of 480 $cm^{-1}$ wavenumber in the Raman spectrum.

In some embodiments, the composite particle may further include a carbon coating layer formed on an outermost portion of the composite particle.

In another embodiment of the present application, a lithium secondary battery includes an anode including an anode active material layer that includes the anode active material for a lithium secondary battery according to the above-described embodiments, and a cathode facing the anode.

In a method of preparing an anode active material for a lithium secondary battery, a carbon-based particle including pores is fired together with a silicon source to form a silicon-containing coating layer at an inside of the pores or on a surface of the carbon-based particle. The carbon-based particle on which the silicon-containing coating layer is formed may be heat-treated while injecting an oxygen gas to form a composite particle including a surface oxide layer formed on the silicon-containing coating layer. The surface oxide layer contains silicon oxide. A silicon oxidation number ratio defined by Equation 1 of the composite particles is 0.6 or less.

silicon oxidation number ratio=$O_B/O_S$    [Equation 1]

In Equation 1, "$O_B$" is an oxidation number of silicon included in the silicon-containing coating layer measured by an X-ray photoelectron spectroscopy (XPS), and "$O_S$" is an oxidation number of silicon included in the surface oxide layer measured by the XPS.

In some embodiments, the heat-treatment may be performed at a temperature from 100° C. to 250° C. to form the surface oxide layer.

In one embodiments of the present application, an anode material for a lithium secondary battery includes a plurality of composite particles. At least one of the composite particles includes a carbon-based particle containing pores therein, a silicon-containing coating layer formed inside the pores, and a surface oxide layer formed on the silicon-containing coating layer inside the pores of the carbon-based particle, the surface oxide layer containing silicon oxide. A distance between a surface of the composite particle and the silicon-containing coating layer is 100 nm to 700 nm, and a distance between the surface of the composite particle and the surface oxide layer formed on the silicon-containing coating layer is 10 nm or less.

In one embodiments of the present application, an anode material for a lithium secondary battery includes a plurality of composite particles. At least one of the composite particles includes a carbon-based particle containing pores therein, a silicon-containing coating layer formed inside the pores or on a surface of the carbon-based particle, and a surface oxide layer formed on the silicon-containing coating layer, the surface oxide layer containing silicon oxide. silicon included in the silicon-containing coating layer has an amorphous silicon structure or has a crystallite size measured by an X-ray diffraction (XRD) analysis of 7 nm or less, and silicon in the silicon dioxide has an oxidation state ranging from 2.9 to 3.6.

In one embodiments of the present application, an anode material for a lithium secondary battery includes a plurality of composite particles. At least one of the composite particles includes an amorphous carbon-based particle containing pores therein having a pore size of 20 nm or less, a silicon-containing coating layer formed inside the pores of the amorphous carbon-based particle, and a surface oxide layer formed on the silicon-containing coating layer, the surface oxide layer containing silicon oxide. The pore size of 20 nm or less restricts a quantity of silicon contained in the amorphous carbon-based particle to thereby reduce cracking in the anode material during repeated charging and discharging cycles.

According to embodiments of the present application, carbon-based particles include pores. For example, the carbon-based particle may be a porous particle including a plurality of pores. A silicon-containing coating layer may be formed on at least one of an inside and a surface of the pores. Accordingly, cracks due to a difference in volume expansion ratio between carbon and silicon during charging and discharging of the secondary battery may be prevented.

In still another embodiment of the present application, a surface oxide layer containing silicon oxide is formed on the silicon-containing coating layer. An oxidation number of silicon included in the surface oxide layer may be greater than an oxidation number of silicon included in the silicon-containing coating layer. Thus, silicon element included in the silicon-containing coating layer may be prevented from reacting with moisture in an air or a solvent (e.g., water) of a slurry to generate gas. Additionally, transformation of the silicon element of the silicon-containing coating layer into silicon oxide may be suppressed, thereby preventing deterioration of capacitive properties of an anode active material.

DETAILED DESCRIPTION OF THE EMBODIMENTS

Figure 1:
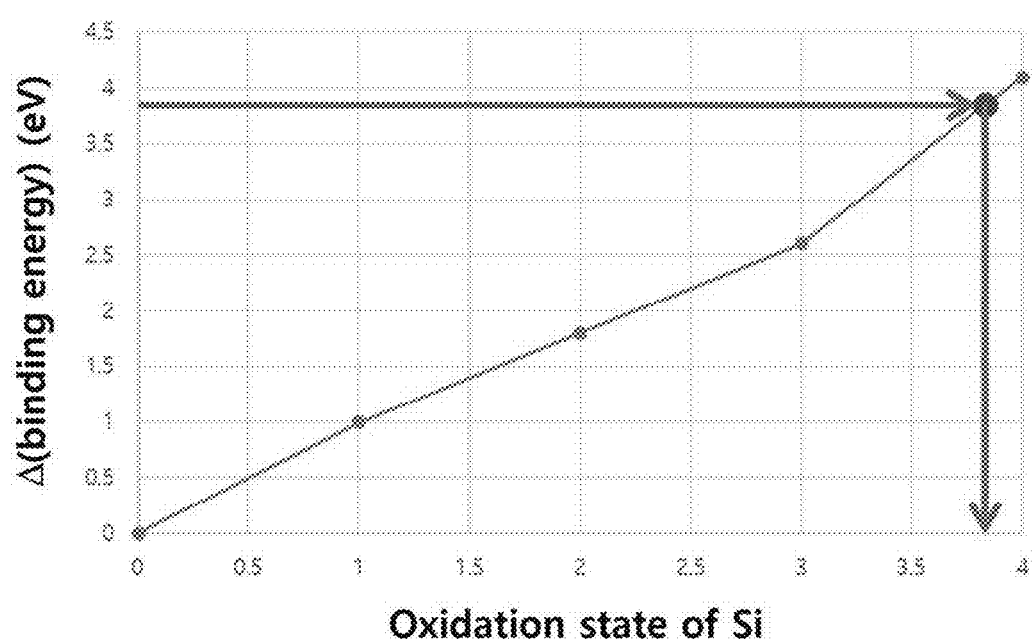
FIG. 1 is a schematic graph showing a silicon oxidation number calibration curve.

According to various embodiments of the present application, an anode active material for a secondary battery including a carbon-based particle and a silicon-containing coating layer is provided. According to other embodiments of the present application, a lithium secondary battery including this type of anode active material is also provided.

Hereinafter, detailed descriptions of the present application will be described in detail with reference to the disclosed embodiments. Such embodiments are provided for an understanding of the present application and do not limit the subject matters disclosed in the detailed description and/or recited in the appended claims.

One embodiment of the present application addresses an issue occurring when the anode active material may be formed to include both silicon and a carbon-based particle. When the anode active material includes a plurality of the carbon-based particles, carbon may partially mitigate a volume expansion of silicon. However, during charging and discharging of a secondary battery, a difference between a volume expansion ratio of silicon (e.g., about 400% or more) and a volume expansion ratio of carbon (e.g., about 150% or less) increases, resulting in cracks in the anode active material. Accordingly, when charging and discharging are repeated, the anode active material may be exposed to an electrolyte thereby causing adverse side reactions such as a gas generation and the subsequent degrading of the life-span properties of the secondary battery.

According to one embodiment of the present application, the carbon-based particle includes pores. For example, the carbon-based particle may be a porous particle including a plurality of pores therein.

In some embodiments, a silicon-containing coating layer may be formed on at least one of an inside of the pores and a surface of a carbon-based particle. Accordingly, cracks due to the difference of the volume expansion ratios between carbon and silicon may be reduced or prevented during charging and discharging.

In various embodiments, the carbon-based particle may have a pore size of 20 nm or less, and preferably, less than 10 nm. Within this range, excessive deposition of silicon in the pores may be reduced, thereby an excessive deposition of silicon in the pores which may cause cracking can be prevented. Accordingly, defects caused by the difference of the volume expansion ratio between carbon and silicon during charging and discharging of the secondary battery may be further suppressed.

In some embodiments, the pore size of the carbon-based particle may be in a range from 0.1 nm to 20 nm, or from 0.1 nm to 10 nm.

For example, the above-mentioned carbon-based particle may include an activated carbon, a carbon nanotube, a carbon nanowire, graphene, a carbon fiber, carbon black, graphite, a porous carbon, pyrolyzed cryogel, pyrolyzed xerogel, pyrolyzed aerogel, or a combination thereof.

In some embodiments, the carbon-based particle may have an amorphous structure or a crystalline structure. In other embodiments, the carbon-based particles may include an amorphous structure. Accordingly, durability of the anode active material may be increased, and generation of cracks by the charge/discharge or the external impact may be suppressed. Thus, the life-span properties of the secondary battery may be improved.

In various embodiments, the anode active material may include a silicon-containing coating layer formed at an inside of the pores of the carbon-based particle and/or formed on a surface of the carbon-based particle. The difference of the volume expansion ratio between carbon and silicon may be alleviated while employing high capacitance properties of silicon included in the silicon-containing coating layer. Thus, micro-cracks and exposure to an electrolyte caused by repeated charging and discharging of the secondary battery due to the micro-cracks may be reduced, and the life-span properties of the secondary battery may be improved while maintaining power properties.

In one embodiment of the present application, the silicon-containing coating layer may refer to a layer in which silicon particles are formed on at least a portion of the pores and/or the surface of carbon-based particle.

In another embodiment, a surface oxide layer containing silicon oxide may be formed on the silicon-containing coating layer. In still another embodiment, the silicon particles located on the surface of the silicon-containing coating layer may be oxidized to form the surface oxide layer.

In one example, the silicon oxide layer may be SiOx (0<x≤2).

In various embodiments, an anode active material for a lithium secondary battery may include a composite particle including the above-described carbon-based particle, the silicon-containing coating layer and the surface oxide layer. For example, the silicon-containing coating layer may be formed directly at the inside of the pores and/or on the surface of the pores. For example, the silicon-containing coating layer may be disposed under the surface oxide layer.

In one embodiment, a distance between a surface of the composite particle and the silicon-containing coating layer is 100 nm to 700 nm, but a position of the silicon-containing coating layer is not limited to the above range.

Additionally, the surface oxide layer may refer to an outermost portion of the silicon-containing coating layer having a distance of 10 nm or less from the surface of the composite particle. For example, a distance between the surface of the composite particle and the surface oxide layer formed on the silicon-containing coating layer is 10 nm or less.

For example, a distance between a surface of the composite particle and the silicon-containing coating layer may be 100 nm to 700 nm, and a distance between the surface of the composite particle and the surface oxide layer formed on the silicon-containing coating layer may be 10 nm or less.

The term "silicon-containing coating layer" as used herein may represent a region in which a distance from an outer surface of the composite particle is 100 nm to 700 nm.

The term "surface oxide layer" as used herein may represent a region in which a distance from the outer surface of the composite particle is 0 nm to 10 nm.

In various embodiments, the composite particle may further include an intermediate region disposed in a region between the silicon-containing coating layer and the surface oxide layer.

The term "intermediate region" as used herein may represent a region in which a distance from the outer surface of the composite particle is greater than 10 nm and less than 100 nm.

The intermediate region may include silicon, silicon oxide, or both silicon and silicon oxide.

In one embodiment of the present application, a side reaction between a silicon element and water may be suppressed by the surface oxide layer, and the life-span properties of the secondary battery may be improved. However, if an excessive amount of silicon is transformed into silicon oxide, the capacitive properties of the anode active material may be degraded.

In various embodiments, an oxidation number of silicon included in the surface oxide layer may be greater than an oxidation number of silicon included in the silicon-containing coating layer. For example, the surface oxide layer may serve as a protective layer for the silicon-containing coating layer. Accordingly, the silicon element included in the silicon-containing coating layer may be prevented from reacting with moisture in air or from reacting with a solvent (e.g., water) of the slurry and generating gas. Additionally, with the surface oxide layer present, transformation of the silicon element of the underlying silicon-containing coating layer into silicon oxide may be suppressed, thereby preventing an excessive reduction of the capacitive properties of an anode active material.

The term "oxidation number" as used herein indicate the number of charge(s) of a specific atom constituting a material assuming that an exchange of electron(s) has completely occurred in the material (a molecule, an ionic compound, a simple substance, etc.). In one example, the oxidation number may indicate an oxidation state.

For example, the oxidation number of $Si^0$ is 0, the oxidation number of $Si^{1+}$ is +1, the oxidation number of $Si^{2+}$ is +2, the oxidation number of $Si^{1+}$ is +3, and the oxidation number of $Si^{4+}$ is +4. The "+" notation in front of the oxidation number can be omitted. For example, the oxidation number of $Si^{1+}$ can be expressed as 1.

A silicon oxidation number ratio (defined by Equation 1 above) of the composite particle is 0.6 or less. In one embodiment, the silicon oxide number ratio of the composite particles may be in a range from 0.01 to 0.5.

$$\text{Silicon oxide number ratio} = O_B/O_S \quad \text{[Equation 1]}$$

In Equation 1, $O_B$ is an oxidation number of silicon included in the silicon-containing coating layer obtained through an X-ray photoelectron spectroscopy (XPS), and $O_S$ is an oxidation number of silicon included in the surface oxide layer obtained through the XPS.

FIG. 1 is a schematic graph showing a silicon oxidation number calibration curve.

Referring to FIG. 1, the silicon oxidation number calibration curve may be obtained as follows.

A graph with the oxidation number of silicon as an x-axis and a value obtained by subtracting 99.6 eV from a binding energy of silicon measured through the XPS (e.g., Δ (binding energy)) as the y-axis may be provided.

In the graph of FIG. 1, points corresponding to $Si^0$, $Si^{1+}$, $Si^{2+}$, $Si^{3+}$ and $Si^{4+}$ are shown, and then the silicon oxide number calibration curve may be obtained, for example, by connecting adjacent points with the shortest distance.

In one example, the binding energies of $Si^0$, $Si^{1+}$, $Si^{2+}$, $Si^{3+}$ and $Si^{4+}$ measured through the XPS may be 99.6 eV, 100.6 eV, 101.4 eV, 102.2 eV and 103.7 eV, respectively. Thus, the points corresponding to $Si^0$, $Si^{1+}$, $Si^{2+}$, $Si^{3+}$ and $Si^{4+}$ have (x, y) coordinates of (0,0), (1,1), (2,1.8), (3,2.6) and (4,4.1), respectively.

In Equation 1, $O_B$ may be obtained by substituting a first value obtained by subtracting 99.6 eV, which is a binding energy of $Si^0$, from a binding energy of silicon included in the silicon-containing coating layer measured by the XPS into the silicon oxidation number calibration curve. From the Δ (binding energy) obtained by the subtraction, the graph of FIG. 1 determines the oxidation state $O_B$.

In Equation 1, $O_S$ may be obtained by substituting a second value obtained by subtracting 99.6 eV from the binding energy of silicon included in the surface oxide layer measured by the XPS into the silicon oxidation number calibration curve. From the Δ (binding energy) obtained by the subtraction, the graph of FIG. 1 determines the oxidation state $O_S$.

For example, each binding energy of silicon included in the silicon-containing coating layer and silicon included in the surface oxide layer may be measured through the XPS. Y values of the silicon oxidation number calibration curve described above may be obtained by subtracting 99.6 eV from each of the measured binding energies. As indicated by the arrows in FIG. 1, oxidation numbers of silicon (e.g., $O_B$ and $O_S$) may be obtained from the x values corresponding to the y values. The indicator line (the arrow) in FIG. 1 is provided to explain this process of obtaining the oxidation number of silicon.

In one embodiment of the present application, the binding energy of the silicon included in the silicon-containing coating layer may be obtained by etching to a depth of 100 nm or more from the surface of the composite particle using an argon (Ar) ion gun (that is an Ar monatomic ion gun).

Within the range of the silicon oxide number ratio, excessive transformation of silicon in the silicon-containing coating layer into silicon oxide may be prevented by controlling the amount of silicon oxide in the surface oxide layer. Thus, the side reactions between silicon and water may be suppressed to maintain the capacitive properties and improve the life-span properties.

In some embodiments, $O_B$ may be in a range from 1.2 to 2.0, and $O_S$ may be in a range from 3.0 to 3.6. Within the above range, the above-noted side reactions occurring in the surface oxide layer may be suppressed while suppressing the excessive oxidation of silicon included in the silicon-containing coating layer.

In various embodiments, an oxygen content of the surface oxide layer measured through the XPS may be greater than an oxygen content of the silicon-containing coating layer measured through the XPS. Accordingly, gas generation due to a contact between silicon and water (as a slurry solvent or moisture in an air) may be suppressed by the surface oxide layer.

In various embodiments, an oxygen content ratio defined by Equation 2 above may be 0.4 or less, preferably in a range from 0.01 to 0.35.

$$\text{Oxygen content ratio} = C_B/C_S \quad \text{[Equation 2]}$$

In Equation 2, $C_B$ is a percentage (at %) of the number of oxygen atoms included in the silicon-containing coating layer relative to a sum of both a) the number of atoms included in the silicon-containing coating layer and b) the number of atoms included in the surface oxide layer measured by the XPS. $C_S$ is a percentage (at %) of the number of oxygen atoms included in the surface oxide layer relative to the sum of both a) the number of atoms included in the silicon-containing coating layer and b) the number of atoms included in the surface oxide layer measured by the XPS.

For example, the number of atoms included in the silicon-containing coating layer and the number of atoms included in the surface oxide layer may refer to the number of all atoms included in the silicon-containing coating layer and the number of all atoms included in the surface oxide layer, respectively.

Within the above oxygen content ratio range, the oxidation of silicon included in the silicon-containing coating layer may be suppressed while suppressing in the composite particle the above-described side reaction of silicon with water. Accordingly, the side reactions between silicon and water may be suppressed to maintain the capacitive properties and improve the life-span properties.

In some embodiments, $C_B$ may be in a range from 8 at % to 15 at %, and $C_S$ may be in a range from 15 at % to 34 at %. Within this range, the surface oxide layer may be formed while suppressing a formation of an oxide layer on the silicon-containing coating layer.

In various embodiments, the above-described silicon-containing coating layer may have an amorphous structure or may contain silicon having a crystallite size of 7 nm or less as measured by an X-ray diffraction (XRD) analysis. In one embodiment, the crystallite size may be 4 nm or less. Within the above range, mechanical stability of the anode active material may be improved during the press process for manufacturing the lithium secondary battery or during the repeated charging and discharging. Accordingly, a capacitive retention may be increased to improve the life-span properties the lithium secondary battery may be improved.

The term "amorphous structure" as used herein refers to a case that a silicon phase included in the silicon-containing coating layer is amorphous or a case that a crystallite size is excessively small and may not be measured through a Scherrer equation (represented by Equation 3 below) using the X-ray diffraction (XRD) analysis.

$$L = \frac{0.9\lambda}{\beta \cos \theta} \quad \text{[Equation 3]}$$

In Equation 3 above, L represents the crystallite size (nm), $\lambda$ represents an X-ray wavelength (nm), $\beta$ represents a full width at half maximum (FWHM) of a peak, and $\theta$ represents a diffraction angle (rad). In various embodiments, the FWHM in the XRD analysis for measuring the crystallite size may be measured from a peak of (111) plane of silicon contained in the silicon-containing coating layer.

In some embodiments, in Equation 3 above, $\beta$ may represent a FWHM obtained by correcting a value derived from an equipment. In one embodiment, Si may be used as a standard material for determining the equipment-derived value. In this case, the equipment-derived FWHM may be expressed as a function of $2\theta$ by fitting a FWHM profile in an entire $2\theta$ range of Si. Thereafter, a value obtained by subtracting and correcting the equipment-derived FWHM value at the corresponding $2\theta$ from the function may be used as $\beta$ in Equation 3 above.

In some embodiments, the silicon-containing coating layer may further contain at least one of SiOx (0<x<2) and silicon carbide (SiC).

In some embodiments, a silicon carbide may not be formed at the inside of the pores or on the surface of the carbon-based particle. For example, the silicon-containing coating layer may not include silicon carbide. For example, the silicon-containing coating layer may contain only silicon and/or silicon oxide. Accordingly, the capacitive properties of the secondary battery may be improved.

For example, the formation of silicon carbide may be suppressed by adjusting a temperature and a time of a silicon deposition.

In some embodiments, the above-described silicon may include an amorphous structure. In this case, the crystallite size of silicon and a peak intensity ratio of a Raman spectrum (as described later) may be maintained within an appropriate range. Accordingly, improved life-span properties may be achieved while maintaining the capacitive properties.

In various embodiments, a peak intensity ratio from a Raman spectrum of silicon included in the silicon-containing coating layer defined by Equation 4 below may be 1.2 or less, preferably 1.0 or less.

$$\text{Peak intensity ratio of Raman spectrum} = I(515)/I(480) \quad \text{[Equation 4]}$$

In Equation 4, I(515) is a peak intensity of silicon included in the silicon-containing coating layer in a region corresponding to a wave number of 515 cm$^{-1}$ in the Raman spectrum, and I(480) is a peak intensity of silicon included in the silicon-containing coating layer in a region corresponding to a wave number of 480 cm$^{-1}$ in the Raman spectrum.

For example, I(515) in Equation 4 may represent a portion of silicon having a crystalline structure included in the silicon-containing coating layer, and I(480) in Equation 4 may represent a portion of silicon having an amorphous structure included in the silicon-containing coating layer.

In the peak intensity ratio range, the amorphous structure ratio of silicon included in the silicon-containing coating layer may be increased, so that structural stability of the anode active material may be improved. Accordingly, the life-span properties of the secondary battery may be improved.

In some embodiments, the above-described crystallite size range and the peak intensity ratio range from the Raman spectrum of silicon included in the silicon-containing coating layer may be both satisfied. Accordingly, the amorphous properties of the silicon-containing coating layer may be further improved, and stability of the anode active material may also be improved. Thus, the life-span properties of the anode active material may be further improved.

In some embodiments, a carbon coating layer may be further formed on an outermost portion of the composite particle. Accordingly, a contact between silicon of the anode active material and moisture in the air or a contact between silicon and water in the anode slurry may be prevented. Thus, a reduction of a discharge capacity and capacitive efficiency of the secondary battery may be suppressed during a period from a preparation of the anode active material to a formation of the anode.

In one embodiment of the present application, the carbon coating layer may refer to a layer in which carbon particles are formed on at least a portion of the silicon-containing coating layer and/or the surface oxide layer.

In some embodiments, the carbon coating layer may include at least one of carbon and a conductive polymer. Accordingly, the above-described effect of preventing contact between water and silicon may be implemented with the formation of the carbon coating layer. Thus, the reduction of the discharge capacity and the capacitive efficiency of the secondary battery may be suppressed.

In one embodiment of the present application, the conductive polymer may include polyacetylene, polyaniline, polypyrrole and/or polythiophene.

In some embodiments, the carbon coating layer may also be formed on a portion of the inside and the surface of the pores of the carbon-based particle on which the silicon-containing coating layer or the surface oxide layer is not formed. For example, the carbon coating layer may entirely cover silicon, silicon oxide and the carbon-based particle on the composite particle including the silicon-containing coating layer and the surface oxide layer formed thereon. Thus, mechanical and chemical stability of the anode active material may be improved while preventing contact between silicon and water.

Hereinafter, a method of preparing the anode active material according to the inventive embodiments is described in more detail.

In various embodiments, a carbon-based particle including pores may be prepared.

In some embodiments, a resol oligomer may be prepared by mixing an aromatic compound containing a hydroxyl group with an aldehyde-based compound. For example, the aromatic compound including the hydroxyl group may include phenol, and the aldehyde-based compound may include formaldehyde. The resol oligomer may be cured by adding a curing agent, and then the carbon-based particles including pores may be obtained by classification, washing with water and firing.

As used herein, "firing" refers to a heating of the object being processed such as the carbon-based particles and does not necessarily mean that a flame is involved in the heating process.

In some embodiments, an aromatic compound and a vinyl-based compound may be mixed and polymerized. Thereafter, the carbon-based particles including pores may be obtained by washing with water and firing. For example, the aromatic compound may include polystyrene, and the vinyl-based compound may include divinylbenzene.

In some embodiments, an activation process may be performed. In this case, an activity of a pore structure in the carbon-based particles may be controlled.

In one embodiment, the activation process may include a physical activation method. For example, a gas having a reactivity with carbon (a steam, a carbon dioxide gas, or a mixed gas of the steam, the carbon dioxide gas and an inert gas) may be introduced, and a heat treatment may be performed at a temperature from 700° C. to 1000° C., for example, for 0.5 to 2 hours.

In one embodiment, the activation process may include a chemical activation method. For example, an acidic or basic chemical such as KOH, $Na_2CO_3$, NaOH and $H_3PO_4$ may be used as an activator. The chemical activation method may be performed at a lower temperature than that of a physical activation method.

Size of pores included in the carbon-based particle obtained by the above method may be 20 nm or less.

In various embodiments, a silicon source may be injected into a reactor where the carbon-based particles containing pores were loaded, and then a firing or heating may be performed to form the silicon-containing coating layer at the inside of the pores and/or the surface of the carbon-based particle.

For example, the silicon source may include a silicon-containing gas. In one embodiment, the silicon-containing gas may be a silane gas.

In some embodiments, the firing or heating may be performed at a temperature less than 600° C., preferably from 100° C. to 300° C., for example, for 1 to 3 hours. Within the above temperature range, silicon having the above-noted amorphous structure may be included in the silicon-containing coating layer. Accordingly, the mechanical stability of the anode active material may be improved during a press process and/or may be improved for repeated charging and discharging of the secondary battery.

In various embodiments, the surface oxide layer may be formed by performing a heat treatment while supplying an oxygen gas to the carbon-based particle on which the silicon-containing coating layer had been formed. For example, the surface oxide layer containing silicon oxide may be formed by oxidizing silicon particles included in a surface portion of the silicon-containing coating layer.

The silicon-containing coating layer and the surface oxide layer may have a silicon oxide number ratio defined by Equation 1 of 0.6 or less.

In another embodiment, the surface oxide layer may be formed by depositing silicon in the pores of the carbon-based particles and/or on the surface of the carbon-based particles, and then oxidizing silicon by exposure to an oxygen gas and a heat treatment. Accordingly, the surface portion of the composite particle may be protected by silicon oxide, and the silicon-containing coating layer may maintain a high-capacity property of silicon.

According to some embodiments, the heat treatment for the formation of the surface oxide layer may be performed at a temperature from 100° C. to 250° C., for example, for 0.5 to 2 hours. Within the above temperature range, the above-noted side reactions of silicon with water may be suppressed while preventing excessive oxidation of silicon.

In some embodiments, the carbon coating layer may be formed on the surface oxide layer by introducing a carbon source into the reactor. For example, the composite particle may include a carbon coating layer formed on an outermost portion of the composite particle.

For example, the carbon source may include pitch, glucose, sucrose, a phenolic hydrocarbon and/or a resorcinol-based hydrocarbons. In this case, firing or heating may be performed after the introduction of the carbon source.

In some embodiments, the carbon source may include a methane gas, an ethylene gas, a propylene gas, an acetylene gas, etc. These may be used alone or in a combination thereof. In this case, the carbon coating layer may be formed by a chemical vapor deposition (CVD). For example, the chemical vapor deposition may be performed by firing or heating the composite particle in the presence of the carbon gas source.

In some embodiments, the carbon source may be a conductive polymer including at least one of polyacetylene, polyaniline, polypyrrole and polythiophene. In this case, the carbon coating layer may be formed by a chemical vapor deposition, an electro-polymerization or a solution process.

In another embodiment, the conductive polymer may be modified into carbon by a firing or heating after coating the conductive polymer.

In some embodiments, the firing or heating for forming the carbon coating layer may be performed at a temperature less than 600° C., for example, for 0.5 to 2 hours. Above this temperature range, a ratio of carbon included in the carbon coating layer to silicon included in the silicon-containing coating layer having the amorphous structure may increased. Accordingly, mechanical stability of the anode active material may be improved during the press process and/or may be improved for repeated charging and discharging of the secondary battery.

Figure 2:
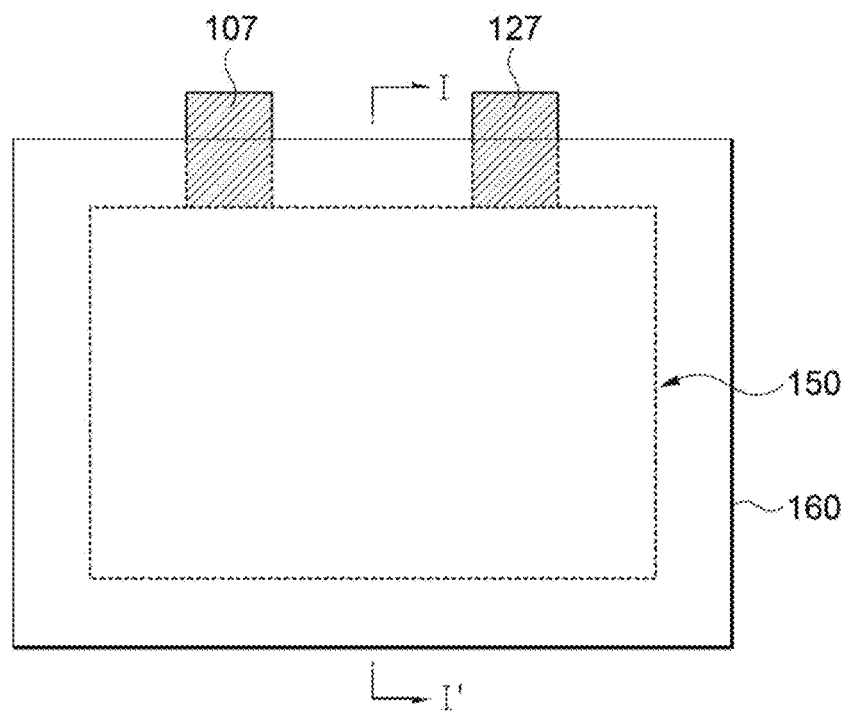
FIG. 2 is a schematic plan view illustrating a secondary battery in accordance with various embodiments of the present application.
Figure 3:
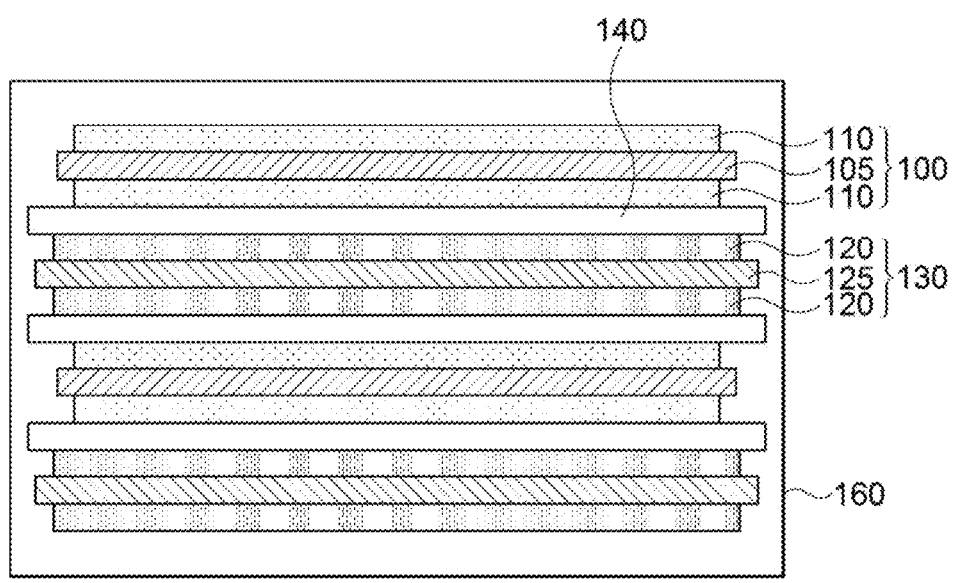
FIG. 3 is a schematic cross-sectional view illustrating a secondary battery in accordance with various embodiments of the present application.

FIGS. 2 and 3 are a schematic plan view and a schematic cross-sectional view, respectively, illustrating a secondary battery according to various embodiments of the present application. For example, FIG. 3 is a cross-sectional view taken along a line I-I' in FIG. 2 in a thickness direction of the lithium secondary battery.

Referring to FIGS. 2 and 3, a lithium secondary battery may include an electrode assembly including an anode 130, a cathode 100 and a separation layer 140 interposed between the cathode and the anode. The electrode assembly may be accommodated and impregnated with an electrolyte in a case 160.

The cathode 100 may include a cathode active material layer 110 formed by coating a mixture containing a cathode active material on a cathode current collector 105.

The cathode current collector 105 may include aluminum, stainless steel, nickel, titanium, or an alloy thereof, or aluminum or stainless steel surface-treated with carbon, nickel, titanium, silver, etc.

The cathode active material may include a compound capable of reversibly intercalating and de-intercalating lithium ions.

In various embodiments, the cathode active material may include a lithium-transition metal oxide. For example, the lithium-transition metal oxide includes nickel (Ni) and may further include at least one of cobalt (Co) and manganese (Mn).

In one embodiment of the present application, the lithium-transition metal oxide may be represented by Chemical Formula 1 below.

$$Li_xNi_{1-y}M_yO_{2+z}$$ [Chemical Formula 1]

In Chemical Formula 1, $0.9 \leq x \leq 1.2$, $0 \leq y \leq 0.7$, and $-0.1 \leq z \leq 0.1$. M may include at least one element selected from Na, Mg, Ca, Y, Ti, Hf, V, Nb, Ta, Cr, Mo, W, Mn, Co, Fe, Cu, Ag, Zn, B, Al, Ga, C, Si, Sn and Zr.

In some embodiments, a molar ratio or a concentration (1−y) of Ni in Chemical Formula 1 may be greater than or equal to 0.8, and may exceed 0.8 in an embodiment.

The mixture may be prepared by mixing and stirring the cathode active material in a solvent with a binder, a conductive material and/or a dispersive agent. The mixture may be coated on the cathode current collector 105, and then dried and pressed to form the cathode 100.

The solvent may include a non-aqueous solvent. For example, N-methyl-2-pyrrolidone (NMP), dimethylformamide, dimethylacetamide, N,N-dimethylaminopropylamine, ethylene oxide, tetrahydrofuran, etc., may be used.

In one embodiment of the present application, the binder may include an organic based binder such as a polyvinylidene fluoride-hexafluoropropylene copolymer (PVDF-co-HFP), polyvinylidenefluoride (PVDF), polyacrylonitrile, polymethylmethacrylate, etc., or an aqueous based binder such as styrene-butadiene rubber (SBR) that may be used with a thickener such as carboxymethyl cellulose (CMC).

For example, a PVDF-based binder may be used as a cathode binder. In this case, an amount of the binder for forming the cathode active material layer may be reduced, and an amount of the cathode active material may be relatively increased. Thus, the capacity and power of the lithium secondary battery may be further improved.

A conductive material may be included to promote an electron movement between active material particles. For example, the conductive material may include a carbon-based conductive material such as graphite, carbon black, graphene, carbon nanotube, etc., and/or a metal-based conductive material such as tin, tin oxide, titanium oxide, a perovskite material such as LaSrCoO₃, LaSr4MnO₃, etc.

In various embodiments, an anode slurry may be prepared from the above-described anode active material including the composite particle. For example, the anode slurry may be prepared by mixing and stirring the anode active material with an anode binder, a conductive material and a thickener in a solvent.

In one embodiment of the present application, the anode active material may include a plurality of the composite particles.

For example, the anode active material may include a plurality of the composite particles and a graphite-based active material. For example, the graphite-based active material may include artificial graphite and/or natural graphite.

An amount of the composite particles based on a total weight of the anode active material (e.g., the total weight of the composite particles and the graphite-based active material) may be 3 wt % or more, 5 wt % or more, 10 wt % or more, 15 wt % or more, 20 wt % or more, 25 wt % or more, 30 wt % or more, 35 wt % or more, 40 wt % or more, or 45 wt % or more.

The amount of the composite particles based on the total weight of the anode active material may be 90 wt % or less, 85 wt % or less, 80 wt % or less, 75 wt % or less, 70 wt % or less, 65 wt % or less, 60 wt % or less, 55 wt % or less, or 50 wt % or less.

In one embodiment, the anode active material may comprise the composite particles and the graphite-based active material.

In one embodiment of the present application, the solvent included in the anode slurry may be an aqueous solvent such as water, an aqueous hydrochloric acid solution, or an aqueous sodium hydroxide solution, etc.

For example, the anode binder may includes a polymer material such as styrene-butadiene rubber (SBR). Examples of the thickener may include carboxymethyl cellulose (CMC).

For example, a conductive material included in the anode slurry may include a material of the same type as that of the above-described conductive material included for forming the cathode active material layer.

In some embodiments, the anode 130 may include an anode active material layer 120 formed by applying (coating) the above-described anode slurry onto at least one surface of an anode current collector 125 and then drying and pressing the anode slurry.

In one example, the anode current collector 125 may include a metal that has high conductivity. This metal may adhere to the anode current collector 125 and may be non-reactive with a base metal of the anode current collector 125 within a voltage range of the battery. For example, a base metal of stainless steel, nickel, copper, titanium, or an alloy thereof, may be used and surface-treated with carbon, nickel, titanium or silver.

The separation layer 140 may be interposed between the cathode 100 and the anode 130. The separation layer 140 may include a porous polymer film prepared from, e.g., a polyolefin-based polymer such as an ethylene homopolymer, a propylene homopolymer, an ethylene/butene copolymer, an ethylene/hexene copolymer, an ethylene/methacrylate copolymer, or the like. The separation layer 140 may be also formed from a non-woven fabric including a glass fiber with a high melting point, a polyethylene terephthalate fiber, or the like.

In some embodiments, an area and/or a volume of the anode 130 (e.g., a contact area with the separation layer 140) may be greater than that of the cathode 100. Thus, lithium ions generated from the cathode 100 may be transferred to the anode 130 without loss by, e.g., precipitation or sedimentation. Thus, the capacity and power of the lithium secondary battery may be improved.

In various embodiments, an electrode cell may be defined by the cathode 100, the anode 130 and the separation layer 140, and a plurality of the electrode cells may be stacked to form the electrode assembly 150 having, e.g., a jelly roll shape. For example, the electrode assembly 150 may be formed by winding, laminating or folding of the separation layer 140.

The electrode assembly 150 may be accommodated together with an electrolyte in the case 160 to define the lithium secondary battery. In various embodiments, a non-aqueous electrolyte may be used as the electrolyte.

In one example, the non-aqueous electrolyte may include a lithium salt and an organic solvent. The lithium salt and may be represented by $Li^+X^-$. An anion of the lithium salt $X^-$ may include, e.g., $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, etc.

The organic solvent may include, e.g., propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxy ethane, diethoxy ethane, vinylene carbonate, sulfolane, gamma-butyrolactone, propylene sulfite, tetrahydrofuran, etc. These may be used alone or in a combination thereof.

As illustrated in FIG. 2, electrode tabs (a cathode tab and an anode tab) may protrude for example from the cathode current collector 105 and the anode electrode current collector 125 included in each electrode cell to one side of the case 160. The electrode tabs may be welded together with the one side of the case 160 to form an electrode lead (a cathode lead 107 and an anode lead 127) extending or exposed to an outside of the case 160.

The lithium secondary battery may be manufactured in, e.g., a cylindrical shape using a can, a square shape, a pouch shape or a coin shape.

Hereinafter, various examples are provided for illustration purposes, and those skilled in the related art would recognize that various alterations and modifications are not excluded by stating these examples.

Example 1 i) Synthesis of resol oligomer: Phenol and formaldehyde were mixed in a molar ratio of 1:2, and 1.5 wt % of triethylamine was added thereto, followed by a reaction under conditions of 85° C., 4 hours and 160 rpm (stirring).
ii) Suspension stabilization of resol oligomer: 1 g of poly(vinyl alcohol) (PVA) was dispersed in a water-dispersible medium, and then added to the resol oligomer.
iii) Curing of resol oligomer: 3 g of HMTA (hexamethylene tetramine) as a curing agent was added to the resol oligomer, and reacted under conditions of 98° C., 12 hours and 400 rpm (with stirring).
iv) Obtaining carbon material: The cured resol oligomer was classified using a sieve, and then washed with $H_2O$.
v) Unreacted monomers and oligomers were removed from the washed resol oligomer using ethanol, and dried.
vi) Carbonization and activation: The dried resol oligomer was calcined at 900° C. for 1 hour under a nitrogen atmosphere. During the firing, $CO_2$ gas was introduced at 1 L/min and carbonized at 900° C.

Formation of Silicon-Containing Coating Layer

A silane gas was injected into a CVD coater at a flow rate in a range from 50 mL/min to 100 mL/min, and a temperature was raised at a heating rate of 5° C./min to 20° C./min and maintained at 200° C. for about 2 hours to deposit silicon, thereby forming a silicon-containing coating layer.

Formation of Surface Oxide Layer

A high-concentration oxygen gas was injected into the CVD coater at a flow rate of 50 mL/min to 100 mL/min, and a temperature was raised at a heating rate of 5° C./min to 20° C./min and maintained at 100° C. for about 1 hour to oxidize the deposited silicon surface, thereby forming a surface oxide layer.

Accordingly, an anode active material including composite particles including carbon-based particles, a silicon-containing coating layer and a surface oxide layer was prepared.

Fabrication of Anode

The prepared anode active material was left for one day. 95.5 wt % of a mixture of 15 wt % of the prepared anode active material and 80.5 wt % of artificial graphite, 1 wt % of CNT as a conductive material, 2 wt % of styrene-butadiene rubber (SBR), and 1.5 wt % of carboxymethyl cellulose (CMC) as a thickener were mixed to form an anode slurry.

The anode slurry was coated on a copper substrate, and dried and pressed to obtain an anode.

Fabrication of Li-Half Cell

A lithium secondary battery was manufactured using the anode manufactured as described above and a lithium metal as a counter electrode (cathode).

Specifically, a lithium coin half-cell was constructed by interposing a separator (polyethylene, thickness of 20 μm) between the prepared anode and the lithium metal (thickness of 1 mm).

The assembly of lithium metal/separator/cathode was placed in a coin cell plate, an electrolyte was injected, a cap was covered, and then clamped. The electrolyte was prepared by preparing a 1M $LiPF_6$ solution using a mixed solvent of EC/EMC (3:7; volume ratio), and then adding 2.0 vol % of FEC based on a total volume of the electrolyte. An impregnation for 3 to 24 hours after clamping was performed, and then 3 cycles of charging and discharging at 0.1 C were performed (charging condition CC-CV 0.1 C 0.01V 0.01 C CUT-OFF, discharging condition CC 0.1 C 1.5V CUT-OFF).

Examples 2 to 5

An anode and a lithium half-cell were manufactured by the same method as that in Example 1, except that an oxidation treatment was performed at a temperature shown in Table 2 when forming the surface oxide layer.

Examples 6 and 7

An anode and a lithium half-cell were manufactured by the same method as that in Example 1, except that the silane gas was injected into the CVD coater at a flow rate of 100 mL/min to 500 mL/min, and a temperature was maintained at 600° C. or higher for about 30 to 120 minutes at a heating rate of 5° C./min to 20° C./min to deposit silicon.

The silicon-containing coating layer included in the anode active material according to Examples 6 and 7 was formed by changing the silane gas flow rate, the heating rate, the temperature and time.

Comparative Example 1

An anode and a lithium half-cell were manufactured by the same method as that in Example 1, except that the surface oxide layer was not formed.

Comparative Example 2

An anode and a lithium half-cell were manufactured by the same method as that in Example 1, except that the oxidation treatment was performed at a temperature shown in Table 2 when forming the surface oxide layer.

Experimental Evaluation (1) Measurement of Silicon Oxidation Number Ratio
1) Measurement of Binding Energy of Silicon Through XPS Each anode prepared according to Examples and Comparative Examples was sampled by being attached to a carbon tape, and an XPS analysis was performed under the following conditions to measure a binding energy of silicon.

[XPS Analysis Conditions]
 i) X-ray type: Al k alpha, 1486.68 eV, 900 μm Beam size
 ii) Analyzer: CAE (constant analyzer energy) Mode
 iii) Number of scans: 50
 iv) Pass energy: 20 eV
 v) Dwell Time: 100 ms
 vi) Ion gun: Ar ion
 vii) Ion energy: 4000 eV
 viii) Etch Cycle: 300 s
 ix) Total Levels: 20

Specifically, the binding energy of silicon included in the surface oxide layer of the anode active material prepared according to Examples and Comparative Examples was measured by using XPS on the surface oxide layer.

Further, a binding energy of silicon contained in the silicon-containing coating layer was measured by measuring the binding energy of silicon in a section where the silicon content was not changed according to a depth (e.g., a distance from the particle surface of 100 nm or more) using an Ar monatomic ion gun.

2) Measurement of Silicon Oxidation Number Ratio

A value obtained by subtracting 99.6 eV from the measured binding energies of silicon included in the surface oxide layer and the silicon-containing coating layer, respectively, was substituted as a y value of a silicon oxide number calibration curve to obtain oxidation numbers of silicon (x value of the oxidation number calibration curve) included in the surface oxide layer and the silicon-containing coating layer.

An oxidation number ratio of silicon was calculated by substituting the obtained oxidation numbers of silicon into Equation 1 above.

(2) Measurement of Oxygen Content Ratio

An XPS analysis was performed on the anode active materials prepared according to Examples and Comparative Examples under the same conditions as those described in Experimental Evaluation (1) 1). From the XPS analysis, a percentage (at %) of the number of oxygen atoms included in the surface oxide layer relative to the total number of atoms included in the silicon-containing coating layer and the surface oxide layer, and a percentage (at %) of the number of oxygen atoms included in the silicon-containing coating layer relative to the total number of atoms included in the silicon-containing coating layer and the surface oxide layer were measured.

(3) Raman Spectroscopy Spectrum Analysis of Silicon

A Raman spectrum of silicon included in the silicon-containing coating layer was measured using a 532 nm laser Raman spectroscopy for each anode active material prepared according to the above-described Examples and Comparative Examples. In the obtained Raman spectrum, a silicon peak intensity in a region of 515 cm$^{-1}$ wave number and a silicon peak intensity in a region of 480 cm$^{-1}$ wave number were measured. A peak intensity ratio (I(515)/I(480)) of the Raman spectrum of silicon was calculated by applying the measured peak intensities to Equation 4 above.

(4) Measurement of Amorphous Property and Crystallite Size of Silicon

A crystallite size was calculated using an XRD analysis and Equation 3 as described above for each anode active material prepared according to the above-described Examples and Comparative Examples, When the silicon particle size was too small to be substantially measured through the XRD analysis, the anode active material was determined as being amorphous.

Specific XRD analysis equipment/conditions are shown in Table 1 below.

TABLE 1

| XRD(X-Ray Diffractometer) EMPYREAN | |
| --- | --- |
| Maker | PANalytical |
| Anode material | Cu |
| K-Alpha1 wavelength | 1.540598 Å |
| Generator voltage | 45 kV |
| Tube current | 40 mA |
| Scan Range | 10~120° |
| Scan Step Size | 0.0065° |
| Divergence slit | ¼° |
| Antiscatter slit | ½° |

Oxidation treatment temperatures, silicon oxidation number ratios, oxygen content ratios, crystallite sizes of silicon and Raman peak intensity ratios of the anode active materials according to the above-described Examples and Comparative Examples are shown in Tables 2 and 3 below.

TABLE 2

| | | silicon oxidation number | | | oxygen content | | |
| --- | --- | --- | --- | --- | --- | --- | --- |
| No. | oxidation temperature (° C.) | surface oxide layer | silicon-containing coating layer | $O_B/O_S$ | surface oxide layer (at %) | silicon-containing coating layer (at %) | $C_B/C_S$ |
| Example 1 | 100 | 3.3 | 1.4 | 0.42 | 25.2 | 8.5 | 0.34 |
| Example 2 | 200 | 3.4 | 1.5 | 0.44 | 30.1 | 8.8 | 0.29 |
| Example 3 | 300 | 3.5 | 1.9 | 0.54 | 32.5 | 13.8 | 0.42 |
| Example 4 | 350 | 3.6 | 2.1 | 0.58 | 34.1 | 15.1 | 0.44 |

TABLE 2-continued

| | | silicon oxidation number | | | oxygen content | | |
| | | | | | silicon- | | |
| | | | silicon- | | surface | containing | |
| | oxidation | surface | containing | | oxide | coating | |
| | temperature | oxide | coating | | layer | layer | |
| No. | (° C.) | layer | layer | $O_B/O_S$ | (at %) | (at %) | $C_B/C_S$ |
|---|---|---|---|---|---|---|---|
| Example 5 | 80 | 2.9 | 1.5 | 0.52 | 22.0 | 8.2 | 0.37 |
| Example 6 | 100 | 3.2 | 1.4 | 0.44 | 25.5 | 8.6 | 0.34 |
| Example 7 | 100 | 3.3 | 1.5 | 0.45 | 25.7 | 8.5 | 0.33 |
| Comparative Example 1 | — | 2.3 | 1.4 | 0.61 | 9.6 | 8.5 | 0.89 |
| Comparative Example 2 | 400 | 3.9 | 3.0 | 0.77 | 34.3 | 20.2 | 0.59 |

TABLE 3

| | silicon-containing coating layer | |
| No. | crystallite size (nm) | peak intensity ratio (I(515)/I(480)) |
|---|---|---|
| Example 1 | amorphous | 0.572 |
| Example 6 | 7.1 | 1.181 |
| Example 7 | 6.94 | 1.22 |

(4) Measurement of Initial Discharge Capacity

Charging (CC-CV 0.1 C 0.01V 0.05 C CUT-OFF) and discharging (CC 0.1 C 1.5V CUT-OFF) were performed once as one cycle at room temperature (25° C.) for the lithium half-cells according to the above-described Examples and Comparative Examples to measure an initial discharge capacity.

(5) Measurement of Initial Capacity Efficiency 10 cycles of charging (CC-CV 0.1 C 0.01V 0.05 C CUT-OFF) and discharging (CC 0.1 C 1.0V CUT-OFF) were performed at room temperature (25° C.) for the lithium half-cells according to the above-described Examples and Comparative Examples to measure a discharge capacity.

The discharge capacity at the 10th cycle was divided by the initial discharge capacity to calculate an initial capacitive efficiency as a percentage.

(6) Evaluation on Life-Span Property (Capacity Retention)

Each lithium half-cell manufactured according to the above-described Examples and Comparative Examples was charged with a constant current at room temperature (25° C.) at a current of 0.1 C until a voltage reached 0.01V (vs. Li), charged with a constant voltage while maintaining 0.01V and cutting off at a current of 0.01 C, and discharged with a constant current of 0.1 C rate until the voltage reached 1.5V (vs. Li).

The charging and discharging were performed as one cycle, and charging and discharging of one cycle was further performed in the same manner. Thereafter, the applied current was changed to 0.5 C and 300 cycles were performed with a 10-minute interphase between the cycles.

The capacitive retention was evaluated by calculating the discharge capacity after the 100 cycles as a percentage relative to the discharge capacity after the first cycle.

(7) Evaluation on Gas Generation

A slurry was prepared by uniformly mixing each anode active material of Examples and Comparative Examples and a CMC binder in a weight ratio of 97:3, and then 3 mL of the prepared slurry was injected into a syringe and sealed. A total volume of the sealed syringe was 12 mL, and a volume of gas generated over time (1 to 7 days) was measured, and a gas generation amount was evaluated according to the following formula.

Gas generation amount (%)={1−($V_a$−$V_b$)/$V_a$}*100

($V_a$: a remaining volume inside the syringe (9 mL), $V_b$: a volume of gas generated from the slurry)

The evaluation results are shown in Table 4 below.

TABLE 4

| No. | initial discharge capacity (mAh/g) | initial capacity efficiency (%) | capacitive retention (%, 100 cycles) | gas generation (%) |
|---|---|---|---|---|
| Example 1 | 1945 | 90.5 | 82.2 | 15 |
| Example 2 | 1921 | 90.4 | 90.2 | 0 |
| Example 3 | 1894 | 90.3 | 92.5 | 0 |
| Example 4 | 1857 | 89.1 | 93.6 | 0 |
| Example 5 | 1943 | 90.4 | 81.5 | 20 |
| Example 6 | 1925 | 88.2 | 85.3 | 0 |
| Example 7 | 1929 | 88.3 | 84.7 | 0 |
| Comparative Example 1 | 1950 | 91.3 | 78.6 | 100 |
| Comparative Example 2 | 140 | 50.2 | 15.9 | 0 |

Referring to Tables 2 to 4, the lithium half-cells of Examples had the silicon oxidation number ratio of 0.6 or less in the silicon-containing coating layer, so that the initial discharge capacity, capacitive efficiency, and life-span property were generally improved compared to those from the lithium half-cells of Comparative Examples.

In Example 4, the oxidation number ($O_B$) of silicon included in the silicon-containing coating layer exceeded 2.0, and the initial discharge capacity and initial capacitive efficiency of silicon were relatively lowered compared to those from other Examples.

In Example 5, the oxidation number ($O_S$) of silicon included in the surface oxide layer was less than 3.0, and the capacity retention was relatively lowered and the gas generation was relatively increased generated compared to those from other Examples.

In Example 6, the crystallite size of silicon included in the silicon-containing coating layer exceeded 7 nm, resulting in the relatively reduced initial capacitive efficiency compared to those from other Examples.

In Example 7, the peak intensity ratio (I(515)/I(480)) of the Raman spectrum of silicon included in the silicon-containing coating layer exceeded 1.2, resulting in the relatively reduced initial capacitive efficiency compared to other Examples.

What is claimed is:

1. An anode active material for a lithium secondary battery comprising:
   a plurality of composite particles, wherein at least one of the composite particles comprises:
   a carbon-based particle containing pores therein, wherein the carbon-based particle comprises a carbon-containing core;
   a silicon-containing coating layer formed inside the pores or on a surface of the carbon-based particle; and
   a surface oxide layer formed on the silicon-containing coating layer, the surface oxide layer containing silicon oxide,
   wherein a silicon oxidation number ratio defined by Equation 1 of the composite particle is 0.6 or less:

silicon oxidation number ratio=$O_B/O_S$  [Equation 1]

where, in Equation 1, $O_B$ is an oxidation number of silicon included in the silicon-containing coating layer measured by an X-ray photoelectron spectroscopy (XPS) and defines a first charge state of the silicon in the silicon-containing coating layer on the carbon-based particle, and $O_S$ is an oxidation number of silicon included in the surface oxide layer measured by the XPS and defines a second charge state of the silicon in the surface oxide layer on the silicon-containing coating layer covering the carbon-containing core, and
   wherein silicon included in the silicon-containing coating layer has an amorphous silicon structure or has a crystallite size measured by an X-ray diffraction (XRD) analysis of 7 nm or less,
   wherein silicon included in the silicon-containing coating layer has a peak intensity ratio of 1.0 or less in a Raman spectrum defined by Equation 4:

peak intensity ratio of Raman spectrum=$I(515)/I(480)$  [Equation 4]

where, in Equation 4, I(515) is a peak intensity of silicon included in the silicon-containing coating layer in a region of 515 cm$^{-1}$ wavenumber in the Raman spectrum, and I(480) is a peak intensity of silicon included in the silicon-containing coating layer in a region of 480 cm$^{-1}$ wavenumber in the Raman spectrum.

2. The anode active material for a lithium secondary battery of claim 1, wherein
   $O_B$ is obtained by substituting a first value, obtained by subtracting 99.6 eV from a binding energy of silicon included in the silicon-containing coating layer measured by the XPS, into a silicon oxidation number calibration curve, and
   $O_S$ is obtained by substituting a second value, obtained by subtracting 99.6 eV from a binding energy of silicon included in the surface oxide layer measured by the XPS, into the silicon oxidation number calibration curve.

3. The anode active material for a lithium secondary battery of claim 2, wherein the silicon oxidation number calibration curve is obtained by connecting points corresponding to $Si^0$, $Si^{1+}$, $Si^{2+}$, $Si^{3+}$ and $Si^{4+}$ with a shortest distance between neighboring points in a graph in which an x-axis represents oxidation numbers of silicon and a y-axis represents the first and second values obtained by subtracting 99.6 eV from the binding energies of silicon measured by the XPS.

4. The anode active material for a lithium secondary battery of claim 1, wherein a distance between a surface of the composite particle and the silicon-containing coating layer is 100 nm to 700 nm, and a distance between the surface of the composite particle and the surface oxide layer formed on the silicon-containing coating layer is 10 nm or less.

5. The anode active material for a lithium secondary battery of claim 1, wherein $O_B$ is in a range from 1.2 to 2.0, and $O_S$ is in a range from 3.0 to 3.6.

6. The anode active material for a lithium secondary battery of claim 1, wherein an oxygen content ratio defined by Equation 2 is 0.4 or less:

oxygen content ratio=$C_B/C_S$  [Equation 2]

where, in Equation 2, $C_B$ is a percentage (at %) of the number of oxygen atoms included in the silicon-containing coating layer relative to a sum of the number of atoms included both in the silicon-containing coating layer and in the surface oxide layer measured by the XPS, $C_S$ is a percentage (at %) of the number of oxygen atoms included in the surface oxide layer relative to the sum of the number of atoms included both in the silicon-containing coating layer and in the surface oxide layer measured by the XPS.

7. The anode active material for a lithium secondary battery of claim 6, wherein $C_B$ is in a range from 8 at % to 15 at %, and $C_S$ is in a range from 15 at % to 34 at %.

8. The anode active material for a lithium secondary battery of claim 1, wherein the carbon-based particle includes at least one selected from the group consisting of an activated carbon, a carbon nanotube, a carbon nanowire, graphene, a carbon fiber, carbon black, graphite, a porous carbon, pyrolyzed cryogel, pyrolyzed xerogel and pyrolyzed aerogel.

9. The anode active material for a lithium secondary battery of claim 1, wherein the carbon-based particle has an amorphous carbon structure.

10. The anode active material for a lithium secondary battery of claim 1, wherein the crystallite size of silicon included in the silicon-containing coating layer is measured by Equation 3:

$$L = \frac{0.9\lambda}{\beta \cos \theta}$$  [Equation 3]

where, in Equation 3, L represents the crystallite size (nm), $\lambda$ represents an X-ray wavelength (nm), $\beta$ represents a full width at half maximum (rad) of a peak corresponding to a (111) plane of silicon contained in the silicon-containing coating layer, and $\theta$ represents a diffraction angle (rad).

11. The anode active material for a lithium secondary battery of claim 1, wherein the composite particle further comprises a carbon coating layer formed on an outermost portion of the composite particle.

12. A lithium secondary battery, comprising:
    an anode comprising an anode active material layer that comprises the anode active material for a lithium secondary battery of claim 1; and
    a cathode facing the anode.

* * * * *